United States Patent Office 3,562,780
Patented Feb. 9, 1971

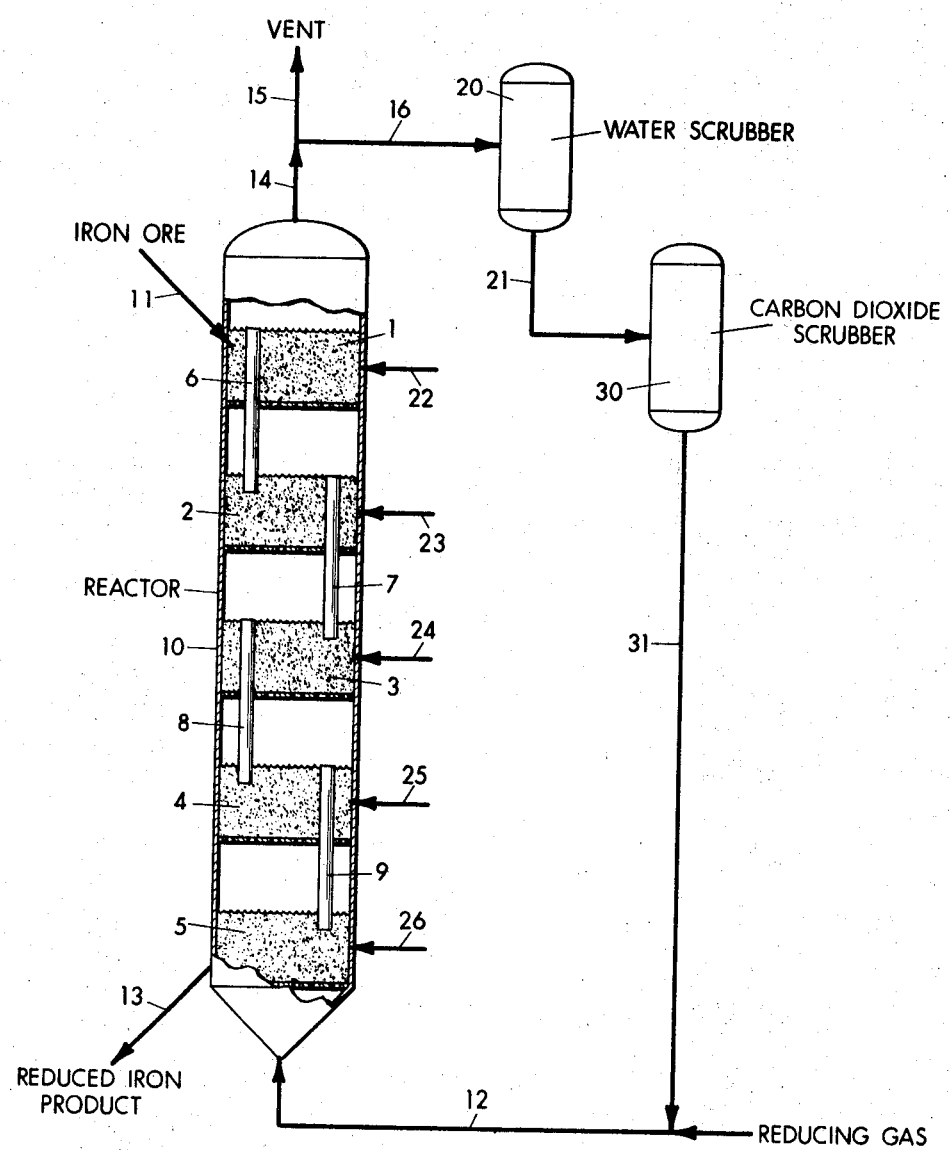

3,562,780
TEMPERATURE CONTROL OF IRON ORE REDUCING FLUIDIZED BEDS
Benjamin Eisenberg, Parsippany, N.J., assignor to Esso Research and Engineering Company, a corporation of Delaware
Filed Sept. 5, 1967, Ser. No. 665,369
Int. Cl. C21b 1/02
U.S. Cl. 75—26     9 Claims

ABSTRACT OF THE DISCLOSURE

In staged fluidized reduction of particulate ores, process heat is provided in one or more of the several stages by injecting into said stages oxygen enriched mixtures of water and/or carbon dioxide.

---

This invention relates to an improved process for the direct reduction of iron ores in fluidized beds. In particular, it relates to improvements in processes for adding process heat to fluidized iron ore reduction systems. It contemplates, generally, steps including the formation of oxygen-enriched steam and carbon dioxide mixtures and injection thereof directly into the fluidized beds of ore to provide process heat. In particular, the mixtures containing from about 10 weight percent oxygen to about 80 weight percent oxygen, and preferably from about 20 weight percent oxygen to about 50 weight percent oxygen, are injected directly into the ferric reduction stage and the final ferrous reduction stage, or other stages, or both, to provide virtually any desired temperature profile throughout the several reaction stages of the process.

In advanced direct iron ore reduction processes, particulate iron ores, e.g., oxidic iron ores which consist essentially of iron oxides, are staged in a series of beds, directly contacted and fluidized by ascending gases, and reduced, at temperatures ranging from about 1000° F. to a temperature not exceeding the sintering temperature of the ore. The sintering temperature for many ores is about 1800° F. but operating temperatures are often much less than this due to a tendency of the particles of ore to stick together at even lower temperatures. This is particularly so in staged reduction processes wherein metallized ore is segregated into discrete stages, and more particularly so where the degree of metallization is increased by staging.

In a typical process, the particulate ore is progressively reduced within the several beds as it descends by flowing downwardly from one bed to a succeeding bed. Simultaneously, the reducing gas is oxidized, at least in part. In most processes, the reducing gas is regenerated by removal of the oxidized components—viz., carbon dioxide or water, or both—and then reused.

The ore is reduced in an initial bed, or beds, from, e.g., ferric oxide to magnetite (magnetic oxide of iron). It is reduced in a succeeding bed, or beds, from magnetite (or mixture approximating the magnetite formula) to ferrous oxide and, finally, in another bed, or beds, from ferrous oxide to metallic iron. Generally, the product ranges from about 85 to about 95 percent metallization and higher, where high metallizations are desired.

In such processes, most of the process heat is provided by injection of intensely hot reducing gases into the final ferrous reduction stage. The gas sequentially imparts heat to the several beds as it ascends through the reactor. Since the gas cools upon ascent, less heat is imparted to the earlier reduction stages of the process. Consequently, to overcome this disadvantage, at least in part, the charged ore is often preheated prior to introduction into the initial stage. The amount of heat which can be added in the latter manner, however, is greatly limited. In the first place, the specific heat of the ore is relatively low. Moreover, the ore cannot be heated to a high degree because of the phenomenon of sintering. Overheating of the ore produces aggregates or agglomerates which cannot be tolerated in the fluidized process. Furthermore, the ore is often adversely preconditioned so that the desired later reduction is inhibited. Even when both the gas and ore are preheated to the maximum degree, there is often insufficient process heat. Such processes, in any event, are often heat-deficient in certain stages and overheated in others.

In prior efforts to overcome these and other disadvantages, high purity oxygen and air have been injected into one or more stages to supplement process heat. These methods, however, leave much to be desired. The use of air, e.g., imposes a heavy burden inasmuch as great volumes of introgen are added to the reduction system. This imparts the efficiency of the process, and adversely affects proper gas utilization. It dilutes reducing gas potential because of the build-up of nitrogen in the recycle system. It wastes heat upon elimination or venting of the nitrogen from the process. On the other hand, while the use of pure oxygen does not produce the same difficulties, oxygen injection produces local overheating and sintering of the ore to produce aggregates or agglomerates. This is especially so in the ferrous reduction stage, or stages, wherein the partially metallized ore particles already possess an acute tendency to stick together. Hence, the use of oxygen, too, has been found unsatisfactory.

Accordingly, there exists an acute need in the art for better methods of heat input into fluidized iron ore reduction processes. In particular, there exists a need for better methods of controlling temperatures in any of the several discrete reduction stages, particularly the ferrous reduction stage, or stages.

It is thus the primary objective of the present invention to supply these needs, and to obviate the foregoing and other prior art difficulties. In particular, it is an object to provide a new and novel method for the supplemental heating of fluidized iron ore reduction processes. More particularly, it is an objective to provide such process wherein the process heat is optimized at the several discrete reduction stages.

These and other objects are achieved in accordance with the present invention which contemplates the formation of oxygen-enriched mixtures of steam (water) or carbon dioxide, or both, for direct injection into the fluidized beds of ore to provide the desired process heat. Suitably, from about 10 percent oxygen to about 80 percent oxygen, and preferably from about 20 percent oxygen to about 50 percent oxygen, based on the total weight of the mixture, are injected into any or all of the several reduction stages. In particular, the mixtures are injected directly into the first ferric reduction stage and final ferrous reduction stage to provide highly uniform heating.

Pursuant to the technique, however, these and other stages can be conveniently supplementarily heated by injection of the mixtures into any respective reduction stage wherein the ore is heated by the ensuing combustion. By means of this technique, it is feasible to provide virtually any desired temperature profile throughout the several reaction stages of the process.

Surprisingly, the relative concentration of oxygen, steam and carbon dioxide in the mixtures can be so optimized that the advantages of heat input to the process far outweigh any disadvantages associated with the injection of already oxidized geses—viz., water or carbon dioxide— which, to some extent, adversely alter the reducing power of the gas. Thus, the normal effects associated with the injection of pure oxygen are completely eliminated, and no extraneous gas, e.g., nitrogen, impose a burden on the process. The added carbon dioxide and water can be conveniently removed and recycled.

This heat input technique is particularly adaptable in supplementing other and more conventional schemes of adding heat to the reduction reaction, as described. In other words, the normal techniques of preheating the reducing gas and iron ore solids feeds can be employed, and supplemented by the presently improved technique.

The invention will be better understood by reference to the enclosed schematic diagram and to the following detailed description which makes reference to the diagram.

Referring to the diagram, there is shown a reactor 10 within which is provided a series of fluidized beds of ore at different stages of reduction. Prepared, dry, finely divided, preheated oxidic iron ore, e.g., hematite or ferric oxide, is fed into the top of reactor 10 via a suitable line 11 and fluidized by reducing gas, e.g., a mixture of carbon monoxide and hydrogen, injected into the bottom of the reactor 10 via a suitable line 12. Ore flows from one bed 1, 2, 3, 4 to the next succeeding bed 2, 3, 4, 5, respectively, via overpour spouts 6, 7, 8, 9. The ore is progressively reduced and the metallized product withdrawn from bed 5 via line 13. The reducing gas is partially oxidized to, e.g., carbon dioxide and water, upon ascent through the reactor, and spent gas is withdrawn therefrom via line 14. A portion of the spent gas can be vented via line 15, but most is regenerated by passage through the water scrubber 20 or carbon dioxide scrubber 30, or both, to remove the oxidized components.

Spent gases are regenerated by removal of water or carbon dioxide, or both, which products of reaction lessen the reducing power of the gas. The spent gas is regenerated, first via passage through line 16 to the water scrubber or cooler 20 wherein a portion of the added water, or water formed during the reaction, is cooled and removed by precipitation. The regenerated gas, or partially treated gas, is then transferred via line 21 to carbon dioxide scrubber 30 wherein carbon dioxide is removed. A basic compound is typically used to scrub out the acidic components of the gas. Monoethanolamine e.g., can be used as the scrubbing agent. And, if desired, the scrubbing agent can be regenerated by conventional means, and reused. In either event, the regenerated gas is then passed via line 31 into line 12 and reheated via means not shown for reintroduction into the reactor 10. Generally, the regenerated gas is added with fresh preheated reducing gases, initially fed through line 12 to the reactor 10, and generally produced by partial oxidation of hydrocarbons or by steam reforming techniques, or other conventional methods.

The reducing gas introduced into the bottom of reactor 10 is generally preheated as much as feasible, this being generally as high as from about 1300° F. to about 1800° F. Higher temperatures are generally unfeasible due to material limitations. The ore fed to the process via line 11 is generally preheated to from about 1200° F. to about 1800° F., higher temperatures being intolerable due to sintering, preconditioning of the ore, and the like.

To provide supplemental process heat, oxygen can be injected into the several beds 1, 2, 3, 4, 5 in admixture with steam (water) or carbon dioxide, or both via lines 22, 23, 24, 25, and 26. In particular, such oxygen-containing mixtures are injected into beds 1 and 5—viz., the initial ferric reduction bed and the final ferrous reduction bed. Pursuant to such techniques, the individual beds can be operated at virtually any desired temperature. In general, the initial ferric reduction beds are operated at the same or at different temperatures ranging from about 1000° F. to about 1800° F., while the latter ferrous reduction stages are operated at temperatures ranging from about 1300° F. to about 1600° F.

It is apparent that various modifications and changes can be made without departing the spirit and scope of the invention.

Having described the invention, what is claimed is:

1. In a process for the production of metallic iron wherein particulate iron ore solids are staged in a series of fluidized beds, fed through the series of beds, including an initial ferric reduction bed and a final ferrous reduction bed, countercurrently contacted with a fluidizing gas, progressively reduced, metallic iron withdrawn from the final stage of the series, and spent reducing gas withdrawn, oxidizing components removed to regenerate the gas, and the regenerated gas recycled to the process, the improvement in the technique of supplying heat thereto comprising injecting a mixture of oxygen with a material selected from water, carbon dioxide, and mixtures thereof directly into any of the several fluidized beds to provide process heat, wherein said material is present in quantities sufficient to avoid local overheating.

2. The process of claim 1 wherein said mixture contains from about 10 weight percent to about 80 weight percent oxygen.

3. The process of claim 1 wherein said mixture contains from about 20 weight percent to about 50 weight percent oxygen.

4. The process of claim 2 wherein the mixture consists essentially of oxygen and steam.

5. The process of claim 2 wherein the mixture consists essentially of oxygen and carbon dioxide.

6. The process of claim 1 wherein said mixture is injected directly into the final ferrous reduction bed of the series.

7. The process of claim 6 wherein the temperature of the ferrous reduction bed ranges from about 1300° F. to about 1600° F.

8. The process of claim 1 wherein said mixture is injected directly into the initial ferric reduction bed of the series.

9. The process of claim 1 wherein said mixture is injected into each and all of the series of beds to provide supplemental heat to the process.

References Cited

UNITED STATES PATENTS

| | | | |
|---|---|---|---|
| 2,481,217 | 9/1949 | Hemminger | 75—26 |
| 2,989,396 | 6/1961 | Lewis | 75—26 |
| 2,990,269 | 6/1961 | Hyde | 75—26 |
| 3,013,876 | 12/1961 | Jenny | 75—26 |
| 3,076,702 | 2/1963 | Hemminger | 75—26 |
| 3,160,499 | 12/1964 | Pfeiffer et al. | 75—26 |
| 3,205,066 | 9/1965 | Robson et al. | 75—26 |
| 3,210,180 | 10/1965 | Jukkola | 75—26X |
| 3,311,466 | 3/1967 | Curlook | 75—26 |
| 3,364,011 | 1/1968 | Porter, Jr., et al. | 75—26 |

DONALD L. WALTON, Primary Examiner

U.S. Cl. X.R.

75—34